US006012490A

United States Patent [19]

Tajima et al.

[11] Patent Number: 6,012,490

[45] Date of Patent: Jan. 11, 2000

[54] PRESSURE CONTROLLING VALVE TO BE ATTACHED TO A BASE-MOUNTED CHANGE VALVE

[75] Inventors: Masamichi Tajima; Takashi Akimoto; Hiroyuki Katsuta, all of Yawara-mura, Japan

[73] Assignee: SMC Corporation, Tokyo, Japan

[21] Appl. No.: 08/955,746

[22] Filed: Oct. 22, 1997

[30] Foreign Application Priority Data

Oct. 29, 1996 [JP] Japan .................................... 8-303578

[51] Int. Cl.[7] .......................... F15B 13/043; G05D 16/10

[52] U.S. Cl. ........................ 137/884; 137/116.5; 137/596

[58] Field of Search ................................ 137/116.5, 884, 137/596

[56] References Cited

U.S. PATENT DOCUMENTS

| | | | |
|---|---|---|---|
| 3,513,876 | 5/1970 | Tarbox | 137/596 |
| 4,267,862 | 5/1981 | Neff et al. . | |
| 4,453,565 | 6/1984 | Neff . | |
| 4,770,210 | 9/1988 | Neff et al. . | |

OTHER PUBLICATIONS

Patent Abstracts of Japan, vol. 97, No. 8, Aug. 29, 1997, JP 9–100922, Apr. 15, 1997.

Patent Abstracts of Japan, vol. 97, No. 1, Jan. 31, 1997, JP 8–247320, Sep. 27, 1996.

Patent Abstracts of Japan, vol. 4, No. 105 (M–023), Jul. 26, 1980, JP 55–063065, May 12, 1980.

Patent Abstracts of Japan, vol. 4, No. 164 (M–041), Nov. 14, 1980, JP 55–112461, Aug. 30, 1980.

*Primary Examiner*—Gerald A. Michalsky

*Attorney, Agent, or Firm*—Oblon, Spivak, McClelland, Maier & Neustadt, P.C.

[57] ABSTRACT

Pressure controlling valve mounted in such a manner as to be directly inserted between a change valve and a base and which has a valve body which is substantially equal to the change valve in width. In the valve body, there are provided a plurality of communication channels that communicate the corresponding ports of the change valve and base, a pressure control valve port that crosses those channels, a pressure control valve stem inserted in the port, and a controlling mechanism which are under a set pressure in cooperative action with the stem. The channels to guide pressure fluid for controlling pressure include a lead port inside the pressure controlling valve step and a lead clearance in the outer region of pressure controlling valve stem.

5 Claims, 6 Drawing Sheets

PRESSURE CONTROLLING VALVE TO BE ATTACHED TO A BASE-MOUNTED CHANGE VALVE

FIELD OF THE INVENTION

The present invention relates to a pressure controlling valve to be attached to a change valve mounted on a base in order to adjust the pressure of the fluid discharged from the change valve as required.

DESCRIPTION OF THE PRIOR ART

To drive a fluid pressure device with a pressure fluid such as compressed air that is supplied through a change valve, the fluid pressure to be supplied to the fluid pressure device should be controlled in some cases, depending on the pressure setting or operating condition of the fluid pressure device. To control the fluid pressure, in general, a pressure control valve such as a pressure reducing valve should be provided inside the pipes that connect the output port of the change valve with the fluid pressure device.

However, if such a pressure controlling valve is connected to the change valve through piping, the piping work will be not only troublesome, but also require considerable installation space since common pressure controlling valves are generally large-sized. This problem, particularly when a base structural element such as a manifold and subplate having a piping port is used by mounting a plurality of change valves on the base, is the result of the same number of pressure controlling valves as that of change valves having to be connected. It may be difficult to attach the pressure controlling valves, depending on the number of change valves. Moreover, this problem has become particularly conspicuous because of the recent miniaturization of change valves.

In order to solve this problem, the inventors proposed a miniaturized change valve in patent application no. 1996-219405. In this application, a plurality of communicating channels that communicate with the corresponding ports of the change valve and the base, and the pressure controlling valve ports to accommodate a pressure controlling valve stem, are functionally combined and set up in overlapping positions inside the body of the change valve in order to utilize the inner space of the change valve move effectively. As a result, the width of the body of the pressure controlling valve was successfully reduced to that of the change valve.

Nevertheless, said change valve still has room for improvement in setting up fluid channels, and such improvement would enable further miniaturization of the change valve, as well as simplify its configuration.

DISCLOSURE OF THE INVENTION

The technical theme of the present invention lies in further miniaturization of a base-mounted change valve and simplification of its configuration by improving the setting up of channels inside the body of the change valve.

To achieve the theme, the present invention provides a small pressure controlling valve that can be installed by inserting it directly into the space between the change valve to change the pressure fluid flow direction and the base to supply a pressure fluid for the change valve.

The valve body of said pressure controlling valve is nearly the same as the change valve in breadth, and can be installed between the change valve and the base so that it does not protrude.

Inside the valve body, an open/shut communication channel that reciprocally communicates with a pair of corresponding ports of said change valve and the base through a pressure controlling valve seat, and a direct communication channel that communicates directly with the other pair of corresponding channels are mounted in a row. In addition, a pressure controlling valve port is also mounted, crossing the open/shut communication channel and direct communication channel, and a valve stem for controlling pressure provided with a pressure controlling structural element is inserted into the pressure controlling valve port.

The pressure controlling valve port communicates with said open/shut communication channel, but does not communicate with the direct communicating channel. Rather, it passes through without shutting the direct communication channel completely, providing the fluid channel cross-sectional the area necessary for the surroundings.

In the controlling chamber mounted at one end of said pressure controlling valve stem, a pressure controlling piston and spring are installed, and a resetting spring is installed in the resetting room at the other end.

The fluid channels that guide the pressure fluid for controlling pressure to said pressure controlling chamber and resetting chamber by communicating with those chambers directly and reciprocally consist of a lead port provided inside the pressure controlling valve stem and a lead clearance between the outer region of the pressure controlling valve stem and pressure controlling valve port.

In the pressure controlling valve configured as above, a plurality of communication channels to communicate with corresponding ports of the change valve and the base, and a pressure controlling valve port to accommodate the pressure controlling valve stem, are functionally combined and set up in overlapping positions inside the body of the pressure controlling valve. In addition, the fluid channels that guide the pressure fluid for controlling pressure to said pressure controlling chamber and resetting chamber by communicating those rooms reciprocally consist of a lead port provided inside the pressure controlling valve stem and a lead clearance formed between the outer region of the pressure controlling valve stem and pressure controlling valve port. As a result, a plurality of fluid channels and parts can be rationally and compactly incorporated inside a valve body that is small in width and height, which leads to further miniaturization of the change valve.

According to one of the embodiments of the present invention, said open/shut communication channel is a supply communication channel that connects supply ports of the base and the change valve. It consists of a first part that communicates with the supplying port of the base and is open to said pressure controlling valve port, and a second part that communicates with the supplying port of the change valve and is open to the pressure controlling valve port at a different location from the first part. The second part communicates with the pressure controlling chamber and the resetting chamber through said lead port and lead clearance.

According to another embodiment of the present invention, the open/shut communication channel comprises a supplying communication channel that connects the supplying ports of the base and the change valve. At the same time, the direct communication channel contains the communication channel for discharges that connects the discharging ports of the base and the change valve and the communication channel for outputs that communicates with the output port of the change valve.

The direct communication channels for outputs communicate with the pressure controlling chamber and the resetting chamber through the lead port and lead clearance.

In the present invention, the lead port is provided to enable communications with the resetting room, and the lead clearance is provided to enable communications with the pressure controlling room.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
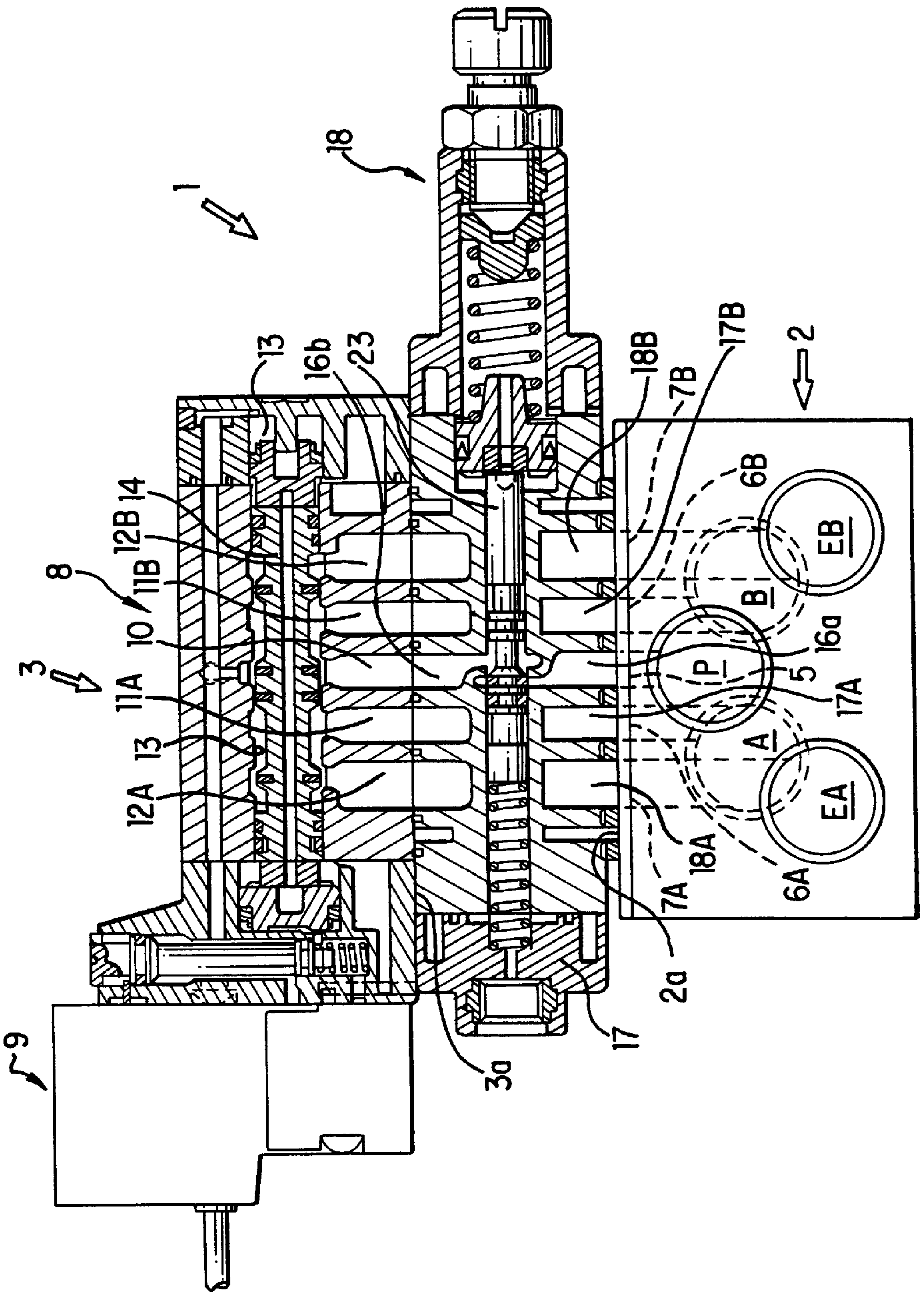
FIG. 1 is a cross sectional view of the pressure controlling valve mounted between the base and the change valve as described in the first embodiment of the present invention.

FIG. 1 shows how the pressure controlling valve 1 is directly installed between base 2 and change valve 3 in the present invention. These parts 1, 2 and 3 are fixed with proper fixing devices such as fixing screws, which are not illustrated.

Base 2 is the general term for structural elements such as a manifold or subplate having a piping port, and is constructed so that one or more change valves can be incorporated in it. The illustration is of a simple base to be used by incorporating one change valve 3. Base 2 is provided with compressed air supplying port P, first discharging port EA and second discharging port EB at one side, and first output port A and second output port B at the other side. The upper face of base 2 features the flat pressure controlling valve mounting face 2*a*, on which supplying port 5 that communicates separately with each port above, first output port 6A, second output port 6B, first discharging port 7A and second discharging port 7B are open in a row.

Change valve 3 is a single pilot system change valve, provided with main valve 8, and pilot valve 9 of the electromagnetic operation system. The lower part of main valve 8 features a flat, controlling valve mounting face 3*a*, on which supplying port 10, first output port 11A, second output port 11B, first discharging port 12A and second discharging port 12B are open in a row. Inside the valve body is valve port 13, to which each port is open, and valve stem 14 is inserted into valve port 13 to enable airtight sliding.

In operation of change valve 3 above, when the pilot fluid is output from pilot valve 9 to main valve 8 by solenoid magnetization, valve stem 14 moves to the right as viewed in the drawing, supply port 10 and first output port 11A communicate with each other, and second output port 11B and second discharging port 12B communicate with each other. If the solenoid magnetization is cancelled, the pilot fluid is discharged from main valve 8. Valve stem 14 is reset to the condition as illustrated, by the pilot valve and the internal pilot fluid supplied to the chamber opposite the pilot valve. Then supplying port 10 and second output port 11B communicate with each other, and first output port 11A and first discharging port 12A communicate with each other.

Change valve 3, however, is not limited to the single pilot system change valve as illustrated. Rather, it can be either a double pilot system change valve or a direct-driven change valve.

Figure 2:
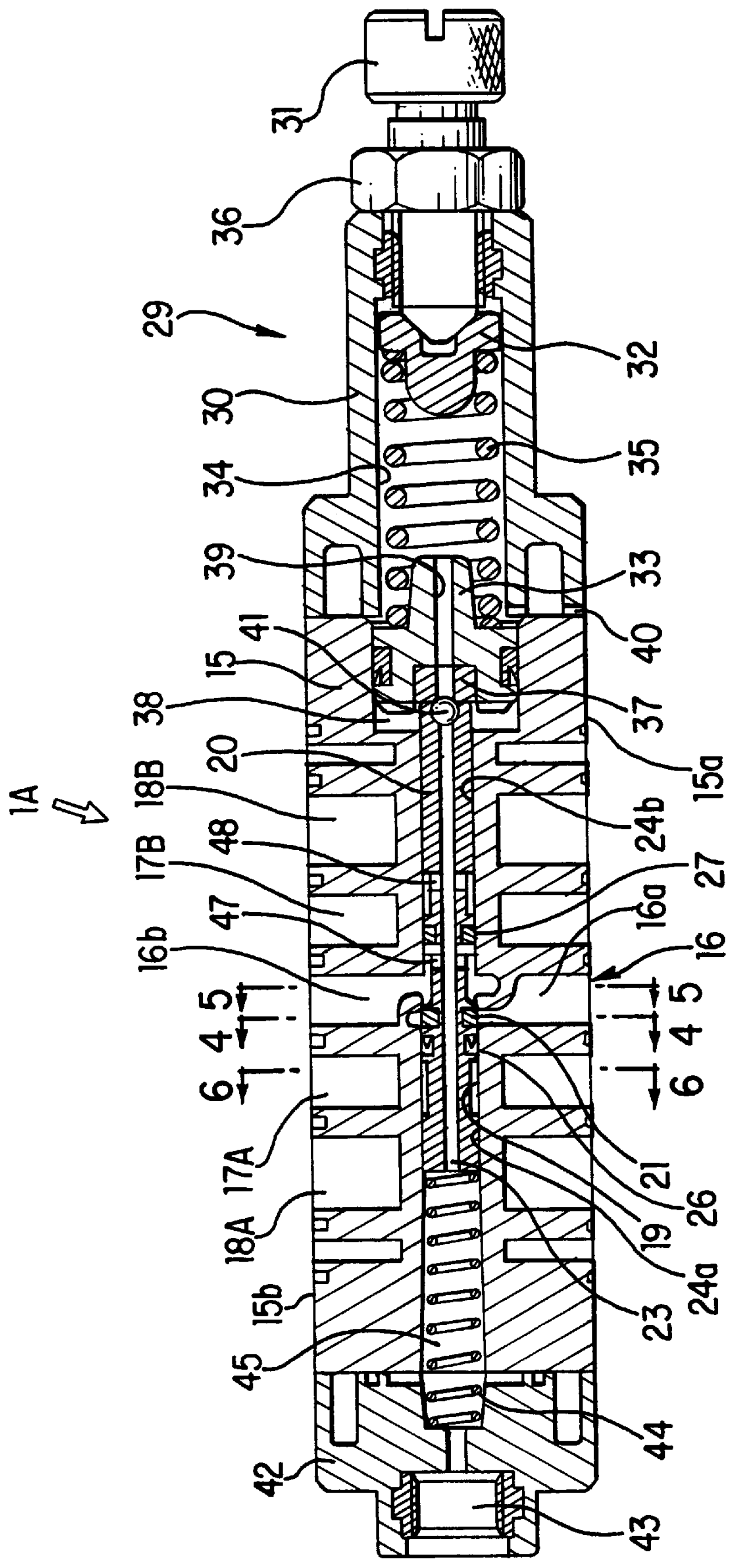
FIG. 2 is an enlarged view of the pressure controlling valve as described in the first embodiment.

As illustrated in FIG. 2, pressure controlling valve 1A in the first embodiment of the present invention is provided with slender valve body 15 having a rectangular cross section that is same as change valve 3 in width. The upper and lower surfaces of valve body 15 are marked 15*a* and 15*b* on which base 2 and change valve 3 are mounted, respectively. Thus, pressure controlling valve 1A can be mounted between base 2 and change valve 3 on these mounting surfaces.

Inside valve body 15, communication channels 16, 17A, 17B, 18A and 18B that connect the corresponding ports of change valve 3 and base 2 are formed between the upper and lower mounting faces 15*a* and 15*b*. Pressure controlling valve port 19 is provided in the manner in which it crosses these communication channels. Into pressure controlling valve port 19, pressure controlling valve stem 20 is inserted to enable free movements.

Of all the aligning channels 16, 17A, 17B, 18A and 18B, communication channel 16 that connects supply port 5 of base 2 and supplying port 10 of change valve 3 is a free-open/shut communication channel having pressure controlling valve seat 25 in-between. Outputting channels 17A and 17B that connect output ports 6A and 6B, and 11A and 11B, respectively, and discharging channels 18A and 18B that connect discharging ports 7A and 7B, and 12A and 12B, respectively, are all direct communication channels that connect ports directly.

Figure 3:
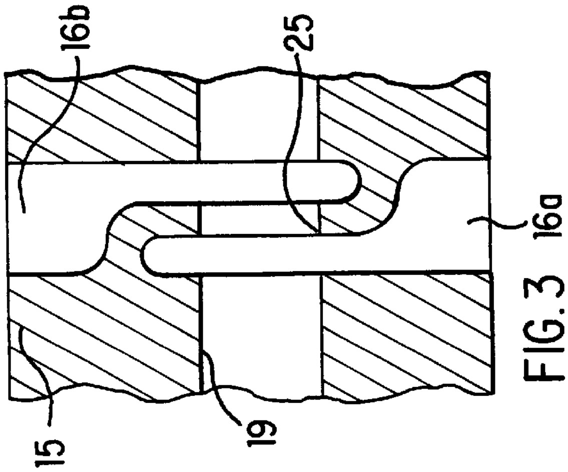
FIG. 3 is an enlarged view of important parts as described in FIG. 2.

As is also seen in FIG. 3, open/shut communication channel 16 consists of first part 16*a*, which communicates with supply port 5 of base 2 and is open to pressure controlling valve port 19, as well as second part 16*b*, which communicates with supply port 10 of change valve 3 and is open to pressure controlling valve port 19 at a different location from first part 16*a*. Pressure controlling valve seat 25 is mounted on pressure controlling port 19 between first part 16*a* and second part 16*b*, which is open or closed from first part 16*a* side by pressure controlling valve structural element 21 mounted to pressure controlling valve stem 20.

Figure 5:
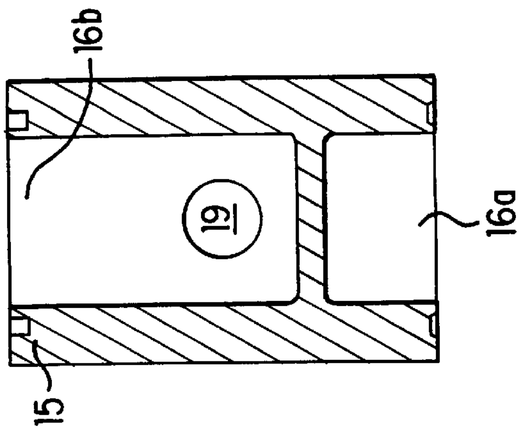
FIG. 5 is a cross sectional view in the 5—5 line as shown in FIG. 2.
Figure 4:
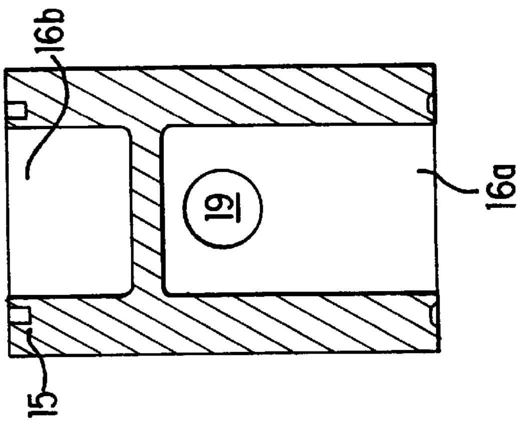
FIG. 4 is a cross sectional view in the 4—4 line as shown in FIG. 2.
Figure 6:
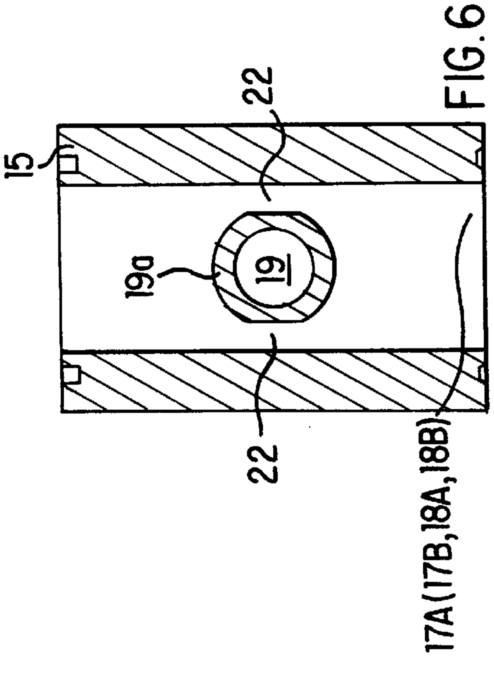
FIG. 6 is a cross sectional view in the 6—6 line as shown in FIG. 2.

As is also seen in FIGS. 4, 5 and 6, pressure controlling valve port 19 communicates with first part 16*a* and second part 16*b* of open/shut communication channel 16 reciprocally, but does not communicate with direct communication channels 17A, 17B, 18A and 18B. It penetrates the center of these direct communication channels, being surrounded by cylindrical wall 19*a* and providing clearance 22 that is necessary for allowing compressed air to flow to the both side. As shown in FIG. 6, the clearance on both side of cylindrical wall 19 can be maximized by cutting off the faces on both sides of cylinder wall 19*a*.

Thus, each communication channel 16, 17A, 17B, 18A and 18B as well as pressure controlling valve port 19 are provided inside valve body 15, crossing each other, which leads to the efficient setting up of these channels in the small space. As a result, the design of valve body 15 is small and functional.

Pressure controlling part 29 is formed at one end of valve body 15. Pressure controlling part 29 has three parts; a pressure controlling chamber 38 that is formed between valve body 15 and cover on the pressure controlling side 30 so that pressure controlling part 29 can connect to pressure controlling valve port 19, a pressure controlling piston 33 accommodated in pressure controlling chamber 38 to enable free sliding, and a pressure controlling spring 35 mounted between pressure controlling piston 33 and spring seat 32 in spring room 34. Pressure controlling spring 35 applies a force to pressure controlling piston 33 toward the side of pressure controlling valve stem 20. The force applied by pressure controlling spring 35 can be adjusted by moving adjusting spring 31. The item numbered 36 is a lock nut to lock adjusting screw 31.

Pressure controlling piston 33 is provided with discharge port 39 that communicates pressure controlling room 38 with the air through spring chamber 34 and respiratory port 40. At the same time, it has relief valve structural element 37 made of elastic structural element that opens discharge port 39 to pressure controlling chamber 38, and discharge port 39 on relief valve structural element 37 is opened or shut by steel ball 41 mounted at the end of pressure controlling stem 20.

At the other end of valve body 15, a resetting chamber 45 that connects to pressure controlling valve port 19 is formed between valve body 15 and resetting-side cover 42, and a reset spring 44 that applies a force to controlling valve stem 20 toward the side of pressure controlling piston 33 is provided inside the resetting chamber 45. The force applied by resetting spring 44 is smaller than that by pressure controlling spring 35.

Resetting chamber 45 communicates with detecting port 43 mounted to resetting-side cover 42 through ports, and the controlled air pressure can be detected with a pressure gauge (not illustrated) mounted to detecting port 43.

Inside pressure controlling valve stem 20, lead port 23 that penetrates in the axis direction is formed. The end of lead port 23 on the pressure controlling chamber 38 side is blocked by ball 41. A lead clearance is formed between the outer region of pressure controlling valve stem 20 and pressure controlling valve port 19 so that compressed air can flow along the entire length of pressure controlling valve stem 20. Clearance part 24*a* on one side from first part 16*a* of open/shut communication channel 16 to resetting chamber 45 is sealed by first seal structural element 26 mounted to pressure controlling valve stem 20, and clearance part 24*b* on the other side from second part 16*b* to pressure controlling chamber 38 is sealed by second seal structural element 27.

Lead port 23 of pressure controlling valve stem 20 and second part 16*b* of open/shut communication channel 16 communicate through first guiding port 47 mounted to pressure controlling valve stem 20. Lead port 23 and clearance part 24*b* communicate through second guiding port 48 mounted pressure controlling valve stem 20 located on the side of pressure controlling chamber 38 rather than second seal structural element 27.

The first seal structural element 26 is lip-shaped, while its seal is directional and has a Y-shaped or V-shaped cross section. Said structural element is installed to stop the compressed air flowing from first part 16*a* of open/shut communication channel 16 to resetting chamber 45, but allows the compressed air to flow in the opposite direction.

In pressure controlling valve 1A, having said configuration, as shown in the first example of embodiment of the present invention, when compressed air is not supplied from supplying port P of base 2 to open/shut communication channel 16, the force applied by pressure controlling spring 35 moves pressure controlling piston 33 and pressure controlling valve stem 20 to the left as seen in the drawing attached, and pressure controlling valve structural element 21 opens pressure controlling valve seat 25. Therefore, first part 16*a* and second part 16*b* of open/shut communication channel 16 communicate with each other, and supplying port P of base 2 and supplying port 10 of change valve 3 communicate with each other.

If the compressed air is supplied to supply port P, the compressed air flows into supplying port 10 of change valve 3 through open/shut communicating channel 16. At the same time, the compressed air flows into lead port 23 through first guiding port 47, then into resetting chamber 45. It also flows into pressure controlling chamber 38 through clearance part 24*b* from second guiding port 48.

As a result, pressure controlling piston 33 is pushed back by the working force of the air pressure applied on piston 33, which is combined with the force of resetting spring 44 applied through pressure controlling valve stem 20. It goes back up to the position where the combined forces and the force applied by pressure controlling spring 35 keep the balance, while compressing pressure controlling spring 35. When the said forces balance, pressure control valve structural element 21 shuts pressure controlling valve seat 25, and first part 16*a* and second part 16*b* of open/shut communication channel 16 are shut each other down.

If the working force of air pressure applied to pressure controlling piston 33 is larger than the force applied by pressure controlling spring 35, the pressure controlling piston 33 is shifted further rearwardly. Therefore, relief valve structural element 37 separates from ball 41 to open discharging port 39, the compressed air in pressure controlling chamber 38 is discharged externally, and the balance between the working force of said air pressure and the force applied by pressure controlling spring 35 is maintained.

Thus, the air pressure (output air pressure) on the side of second part 16*b* of open/shut communication channel 16 can be adjusted to the pressure set by pressure controlling spring 35. The air pressure can be detected by the pressure gauge installed at detecting port 43.

The setting of the air pressure can be changed by moving pressure controlling screw 31 forward or backward and adjusting the force applied by pressure controlling spring 35.

If supply port P of base 2 is open to the outside, air in resetting chamber 45 flows into first part 16*a* by pushing first seal structural element 26 open. Thus, the balance of the forces applied on the both side of pressure controlling valve stem 20 is lost, conversion of the pressure controlling valve stem 20 opens pressure controlling valve seat 25 to discharge the remaining pressure through pressure controlling valve seat 25.

In the first embodiment of the present invention, second part 16*b* of open/shut communication channel 16 can be directly communicated with clearance part 24*b* by omitting second seal structural element 27. In this case, second guiding port 48 can be omitted.

Figure 8:
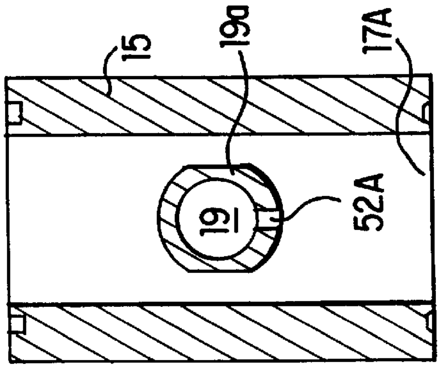
FIG. 8 is a cross sectional view on the 8—8 line in FIG. 7.
Figure 7:
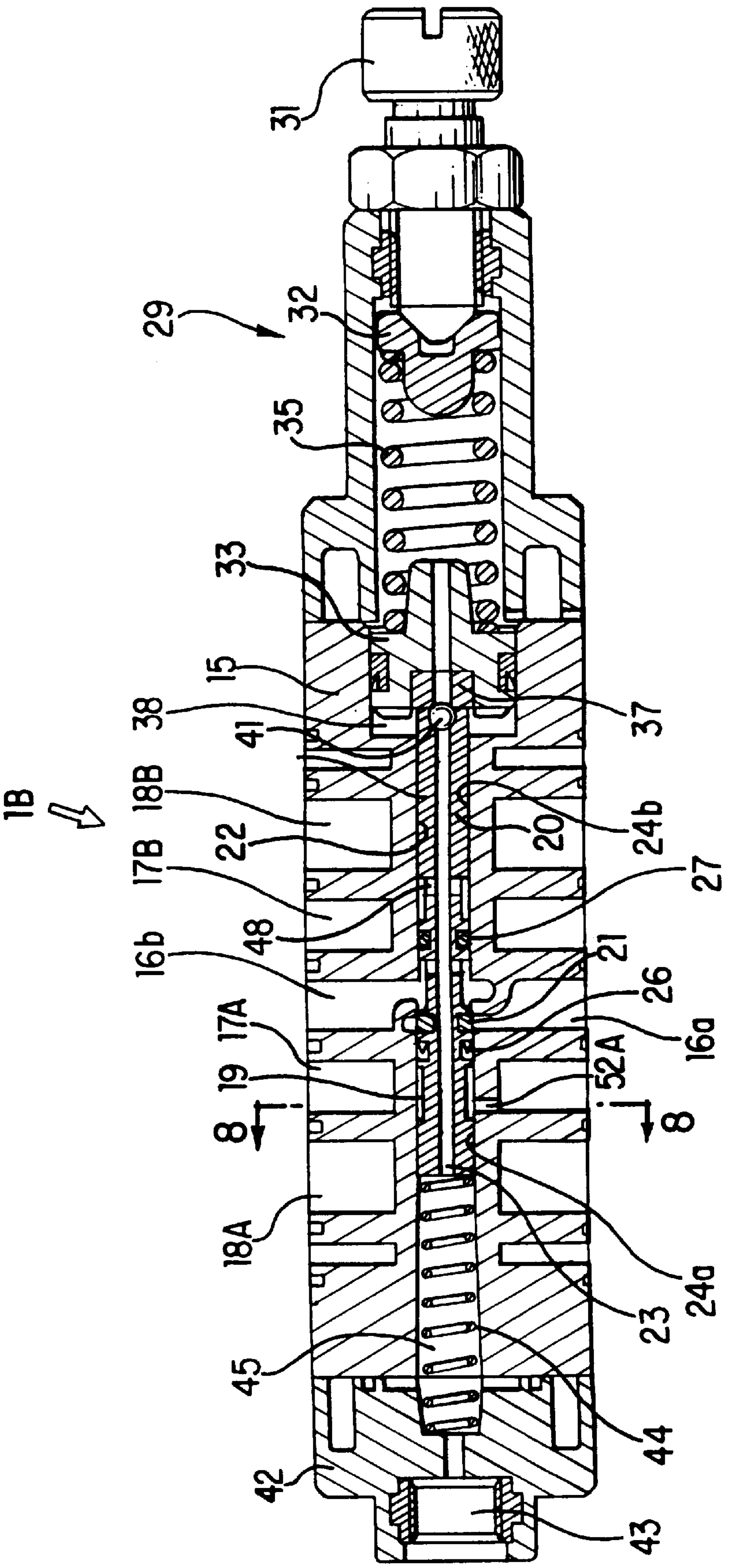
FIG. 7 is a cross sectional view of the invention in the second embodiment of the present invention.

FIG. 7 shows the second embodiment of the pressure controlling valve, which differs from the first in that pressure controlling valve 1B takes compressed air for controlling pressure from direct communication channel 17A. In pressure controlling valve 1B, port 52A communicating with pressure controlling valve port 19 is mounted to first direct communication channel for output 17A that connects first output port 6A of base 2 and first output port 11A of change valve 3. Compressed air for controlling pressure from the first direct communication channel for output 17A is guided to pressure controlling chamber 38 through lead port 52A, clearance part 24*a* of the outside region of pressure controlling stem 20, resetting chamber 45, lead port 23, second guiding port 48 and clearance part 24*b*, as shown in FIG. 8. Therefore, in the second embodiment of the present invention, first guiding port 47 as shown in the first example is not formed on pressure controlling valve stem 20.

As explained above, the channel to guide compressed air for controlling pressure is the only difference between the first and second embodiments of the present invention. As the method for controlling pressure in the second embodiment of the present invention is actually the same as that in the first embodiment, the main components have the same reference numbers as in the first embodiment of the present invention, and thus a detailed explanation thereof is omitted.

Figure 9:
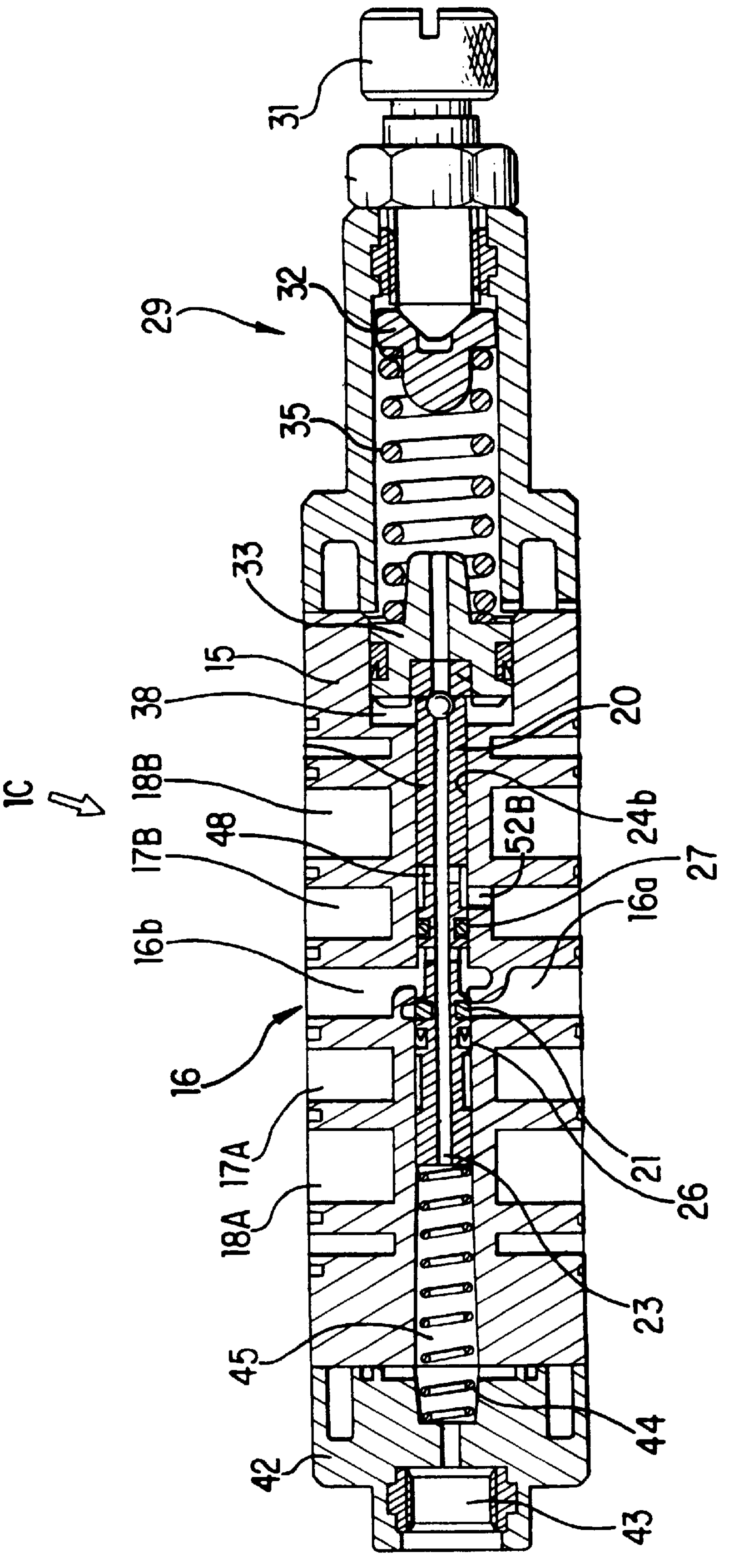
FIG. 9 is a cross sectional view of the third embodiment of the present invention.

FIG. 9 shows the third embodiment of the pressure controlling valve in the present invention. Pressure controlling valve 1C in the third embodiment of the present invention differs in the guiding of the compressed air for controlling pressure from pressure controlling valve lB in the second embodiment of this invention. Therefore, in pressure controlling valve 1C, port 52B that communicates with pressure controlling valve port 19 is mounted to second direct communicating channel for output 17B that connects second output port 6B of base 2 to second output port 11B of change valve 3. Compressed air for controlling pressure of second direct communication channel for output 17B is guided from port 52B to pressure controlling chamber 38 through clearance part 24*b* of the outside region of pressure controlling stem 20. At the same time, the compressed air is guided to resetting chamber 45 through second guiding port 48 and lead port 23. Therefore, in the third embodiment of the present invention, first lead port 47 shown in the first example is not formed on pressure controlling valve stem 20.

As explained above, the use of a channel to guide compressed air for controlling pressure is the only difference between the first and third embodiments of the present invention. As the method for controlling pressure in the third embodiment of this invention is actually the same as that in the first, the main components thereof having the same reference numbers as in the first example of embodiment of the present invention, and thus a detailed explanation thereof is omitted.

In each above-referred embodiment of the present invention, base 2 and change valve 3 are formed with output ports 6A and 6B, and 11A and 11B respectively because base 2 is provided with output port P, and pressure controlling valves 1A, 1B and 1C are equipped with direct communication channels for output 17A and 17B that connect to their output ports. Output port P, however, may be mounted to change valve 3 rather than being mounted to base 2, in which case compressed air for controlling pressure can be collected using output ports 6A and 6B of change valve 3 and direct communication channels for output 17A and 17B of pressure controlling valve 1A, 1B and 1C, even if base 2 does not have an output port. In this case, the end of the communication channel on the base 2 side is sealed by a gasket.

In the example of operation illustrated above, change valve 3 is a five-port valve, and pressure controlling valves 1A, 1B and 1C have five communication channels accordingly. The change valve, however, can also be a 3-port valve. In this case, the pressure controlling valve will have three communication channels.

FIGS. 10A to E show examples of deformed pressure controlling valve stem 20 and pressure controlling piston 33.

Figure 10A:
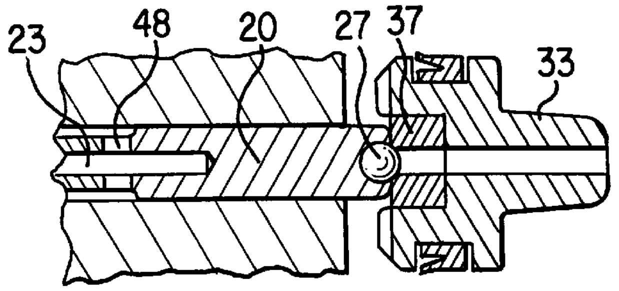
FIGS. 10A–E are cross sectional views of an example of the deformation of the pressure controlling valve stem and a pressure controlling piston.

The first deformed sample shown in FIG. 10A is different from other examples in that lead port 23 formed in pressure controlling valve stem 20 reaches up to second lead port 48 without penetrating up to pressure controlling chamber 38, and ball 27 is mounted to the end of pressure valve stem 20 without any connection to lead port 23.

Figure 10B:
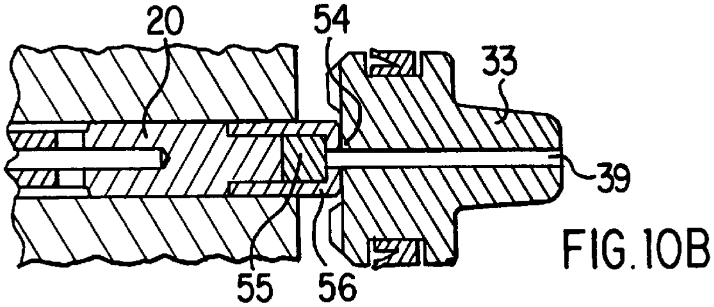

In the second sample shown in FIG. 10B, relief valve seat 54 is formed at the end of discharging port 39 of pressure controlling piston 33, and relief valve structural element 55 is mounted at the end of pressure controlling valve stem 20 with cap 56.

Figure 10C:
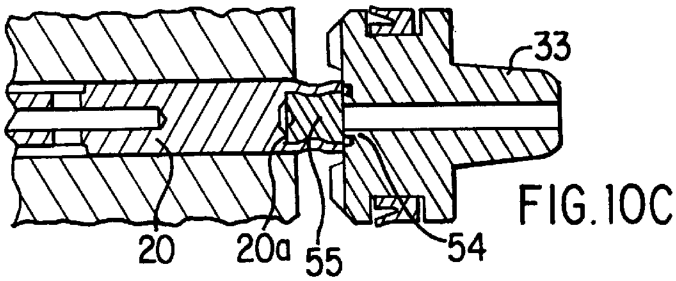

In the third sample shown in FIG. 10C, relief valve structural element 55 is directly mounted by press fitting or adhering informal concave 20a at the end of pressure controlling valve stem 20.

Figure 10D:
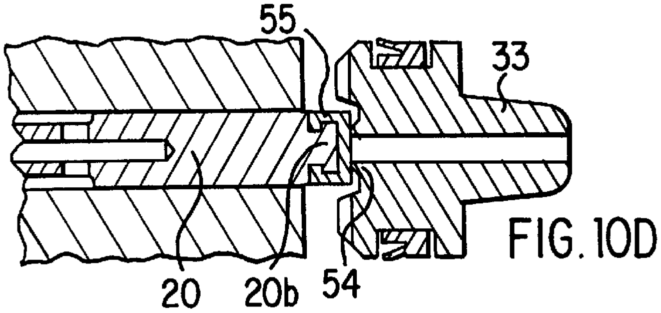

In the fourth sample shown in FIG. 10D, relief valve structural element 55 is mounted by press fitting or adhering outside mounting part 20*b* at the end of pressure controlling valve stem 20.

Figure 10E:
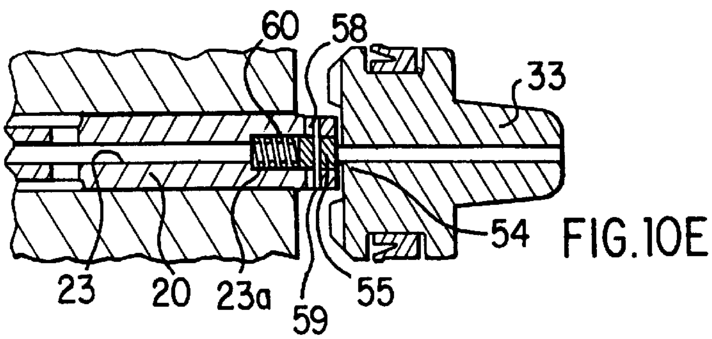

In the fifth sample shown in FIG. 10E, the diameter of lead port 23 that penetrates pressure controlling valve stem 20 is enlarged at both ends, and groove 58 is formed at the enlarged diameter area 23*a* in the same direction with the diameter. Relief valve structural element 55 to open/shut relief valve seat 54 of pressure controlling piston 33 is mounted to enlarged diameter area 23*a* with pin 59 inserted into groove 58 so that it can move slightly to the right and to the left as seen in the drawing. It is pushed toward relief valve seat 54 by spring 60.

Thus, in the present invention, a plurality of communication channels to communicate with corresponding ports of the change valve and the base, and a pressure controlling valve port to accommodate the pressure controlling valve stem are functionally combined and set up in overlapping positions inside the body of the pressure controlling valve. In addition, the fluid channels to guide the pressure fluid for controlling pressure to said pressure controlling chamber and resetting chamber by communicating those chambers reciprocally consist of a lead port provided inside the pressure controlling valve stem and a lead clearance formed between the outer region of the pressure controlling valve stem and pressure controlling valve port. As a result, a plurality of fluid channels and parts can be incorporated rationally and compactly inside a valve body that is narrow and short width, which leads to further miniaturization of the change valve.

What is claimed is:

1. A pressure controlling valve to change a fluid pressure, being mounted between a change valve changing the direction of a pressure fluid and a base supplying pressure fluid to said change valve, said pressure controlling valve having a valve body with substantially the same width as said change valve and being positioned between said change valve and the base;

a plurality of opening and closing communication channels placed in a row in said valve body, which communicate directly with a pair of corresponding ports of said change valve and the base via a pressure controlling valve seat, at least one direct channel which communicates directly with ports formed in said base;

a plurality of pressure controlling valve ports mounted in said valve body so as to cross said opening and closing communication channels and said at least one direct communication channel, which communicate with said opening and closing communication channels but do not communicate with said at least one direct communication channel, and which penetrate into said at least one direct communication channel;

a pressure controlling valve stem to install said pressure controlling valve ports internally in such a manner as to enable free movement;

a pressure controlling valve structural element mounted on said pressure controlling valve stem, which opens and closes said pressure controlling valve seat;

a pressure controlling chamber mounted at one end of said pressure controlling valve stem and a pressure controlling piston mounted in said pressure controlling chamber so as to enable free movement thereof and a pressure controlling spring which pushes said pressure controlling piston toward the pressure controlling valve stem side;

a resetting chamber mounted at the other end of said pressure controlling valve stem and a resetting spring mounted in said resetting chamber such that said resetting spring pushes the pressure controlling valve stem toward the pressure control piston side;

a plurality of lead ports that respectively communicate with said pressure controlling chamber and resetting chamber and from channels to guide the pressure fluid for controlling pressure to each chamber with any of said communication channels, which are formed inside said pressure controlling valve stem, and a lead clearance formed so as to penetrate the lead ports between the outer region of said pressure valve stem and pressure valve ports.

2. The pressure controlling valve of claim 1 in which said opening and closing communication channel comprises a supply communication channel, connecting supply ports of said base and change valve, said opening and closing communicating channel comprising a first part communicating with the supply port of the base to open to said pressure controlling valve port and a second part communicating with the supply port of the change valve to open said pressure controlling valve port at a different location from the first part, and said opening and closing communication channel having said pressure controlling seat between the first and second parts with the second part communicating with pressure controlling chamber and resetting chamber through said lead ports and said lead clearance.

3. In the pressure controlling valve of claim 1 in which said opening and closing communication channel is a supply channel connecting the supply ports of said base and change valve, the direct communication channel contains a communication discharges channel connecting discharging ports of the base and the change valve and a communication output channel to communicate with an output port of the change valve, and the direct communication channel communicates with the pressure controlling chamber and resetting chamber through said lead port and said lead clearance.

4. In the pressure controlling valve described in any of claims 1 to 3 in which said lead port is provided to communicate with the resetting chamber, and lead clearance is provided so that it may communicate with the pressure controlling chamber.

5. In the pressure controlling valve described in any of claims 1 to 3 in which said pressure controlling piston has discharging ports to open the pressure controlling chamber to external environment, and structural materials to open or shut the discharge port are mounted at the end of said pressure controlling valve stem.

* * * * *